United States Patent Office 3,721,071
Patented Mar. 20, 1973

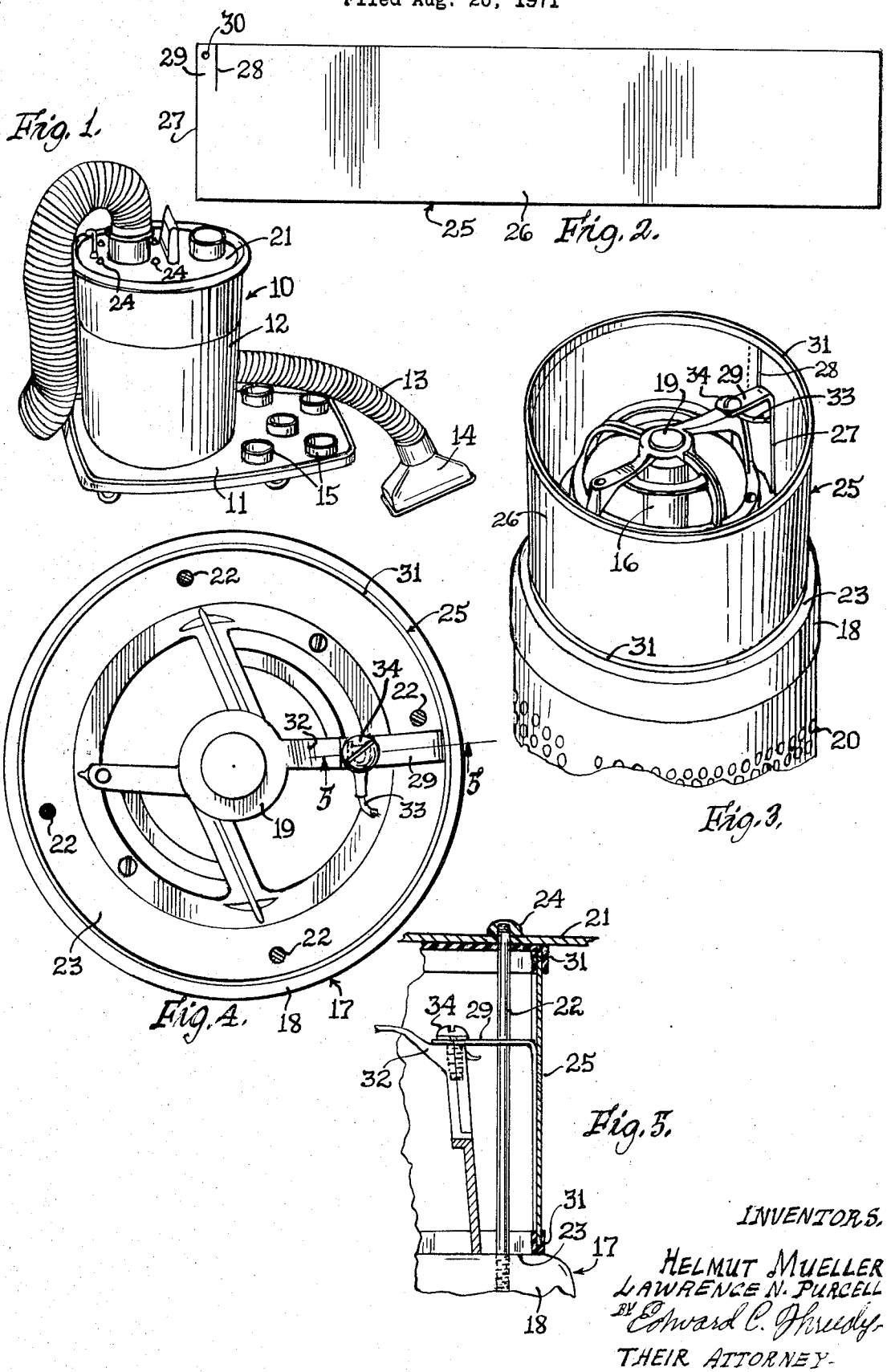

3,721,071
SEALED AND GROUNDED ELECTRIC
MOTOR HOUSING
Helmut Mueller and Lawrence N. Purcell, both of
P.O. Box 482, Palatine, Ill. 60067
Filed Aug. 20, 1971, Ser. No. 173,566
Int. Cl. B01d 46/42
U.S. Cl. 55—360                                  6 Claims

ABSTRACT OF THE DISCLOSURE

An electric motor housing for a vacuum type apparatus that requires the motor to be sealed against dirt, dust, and debris and completely electrically grounded, including a filter support mounted upon an electric motor which is in turn confined within a metal protective sleeve including peripheral gaskets for sealing the sleeve between the motor casting and the apparatus cover, with the sleeve providing an integral yieldable grounding lug for connection to the motor and grounding wire of the electrical supply cord.

SUMMARY OF THE INVENTION

In a vacuum type apparatus, an electric motor having a protective sleeve for sealing the motor between the motor casting and cover for the apparatus and for electrically grounding the motor and sleeve against shock hazards through shorts and/or defective electrical connections.

As the electric motor in a vacuum apparatus of the hereinafter described type is carried within the vacuum collector, it must be sealed against dirt, dust and debris. To achieve a sealed motor housing, there is provided a protective sleeve embracing the motor and which, by proper peripheral gaskets pressed between the apparatus cover and motor mounting, seals the same within the vacuum canister.

The electric motor as well as its protective sleeve is required to be connected to the third or ground wire of the electrical cord of the apparatus without affecting the sealing function of the protective seal. This is accomplished by providing an integral finger on the sleeve for connecting to the motor and grounding wire of the cord, regardless of the act of compression of the sleeve between the apparatus cover and the motor mounting.

GENERAL DESCRIPTION

The invention will be best understood by reference to the accompanying drawing, in which is shown the preferred embodiment of the invention, and in which:

FIG. 1 is a perspective view of the complete electrically operated vacuum type apparatus;

FIG. 2 is a plan view of the preassembled protective sleeve for the electric motor used in the vacuum apparatus;

FIG. 3 is a fragmentary perspective view of the protective sleeve mounted upon the motor casting;

FIG. 4 is a top plan view of the motor casting and sleeve connection; and

FIG. 5 is a fragmentary detailed sectional view taken on line 5—5 of FIG. 4.

This invention relates to a specific electric motor housing used in a semi-industrial utility type vacuum apparatus 10, as shown in FIG. 1. The vacuum apparatus 10 includes a castered dolly 11 that supports a vacuum canister 12. Attachments, such as hose lengths 13 and pickup tools 14, are adapted to be carried on circular studs 15 provided on the forward top surface of the dolly 11, as shown.

Mounted within the collector canister 12 is an electric motor 16 (partially shown) carried by a casting 17 which includes a peripherally flared skirt 18 and a top spider-like carriage 19.

Mounted upon and depending from the skirt 18 is a perforated filter support 20. This filter support 20 in turn carries a cloth and paper filter (not shown) for protecting the motor 16 within the collector canister 12 against accumulation of dirt, dust and debris.

The motor 16 and its casting 17 are suspended from beneath the removable cover 21 of the collector canister 12 by elongated rods 22, each of which have one end threadable into suitable tapped apertures formed in the flared portion 23 of the skirt 18. The opposite ends of the rods 22 project through the cover 21 and receive acorn type nuts 24.

Between the flared skirt 18 of the casting 17 and the cover 21 and encircling the motor 16 and spider-like carriage 19 as well as the connecting rods 22, is a protective sleeve 25.

This protective sleeve 25 is formed from a substantially flat sheet of metal 26, as shown in FIG. 2. As shown in such figure, one end 27 of the sleeve 25 has a cut 28 that extends from one longitudinal edge inwardly a sufficient distance to form a yieldable tab 29. The tab 29 is in turn tapped as at 30 to provide a screw-receiving hole. The opposite short ends of the sheet 26 are overlapped and welded together with the tab 29 positioned on the inner wall surface of the then formed sleeve, as shown in FIGS. 3 and 5. The top and bottom peripheral edges of the sleeve 25 are provided with channeled sealing gaskets 31 preferably made of a resilient material, such as rubber and the like.

In assembling the unit, the rods 22 are threaded into the skirt 18 of the motor casting 17. The protective sleeve 25 is then placed upon the flared portion of the skirt 18, and the tab 29 is placed in alignment with one arm 32 of the spider-like carriage 19, and the free end of the grounding wire 33 is placed upon the tab 29, with a holding screw 34 projected through the tapped hole 30 formed in the end of the tab 29 and into a suitable threaded base formed in the spider arm 32, as shown in FIG. 5. Thus, the motor casting 17 as well as the sleeve 25, is connected to the grounding wire 33 of the apparatus' electrical cord.

The cover 21 is then placed upon the collector canister 12, with the rods 22 projecting through the holes formed therein, so that the acorn type nuts 24 may be threaded onto such rods 22, compressing the cover 21 against the upper-edge gasket 31 of the sleeve 25 and at the same time compressing the lower-edge gasket 31 against the skirt 18 of the motor casting 17, so as to protectively seal the electric motor as desired.

During the compression of the gaskets 31 as carried by the peripheral edges of the sleeve 25, the grounding tab 29 which has been angularly bent so as to be positioned onto the spider arm 32, may yieldably adjust its angled relation during such compression, without disturbing the electrical grounding contact made thereby.

From the foregoing, it is apparent that there is provided a simple, yet highly effective structure for sealing an electric motor of a vacuum type apparatus against the accumulation of dirt, dust and debris, while electrically grounding all of such parts of the motor housing as is required for safety purposes.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A sealed and grounded housing for an electric motor of a vacuum type apparatus including a motor casting carrying a filter support and filter, all of which is adapted to be mounted within a collector canister, wherein the improvement comprises:
   (a) a vacuum collector canister having a removable cover,
   (b) an electric motor supporting casting suspended from said cover within said canister,
   (c) means for connecting said casting to said cover,
   (d) means compressed between said cover and a portion of said casting for sealing the motor supported thereby from the interior of said collector canister, and
   (e) means provided by said sealing means and cooperating with said casting for connecting a grounding wire to said casting and said sealing means when the electric motor is mounted to said cover of the collector canister.

2. A sealed and grounded housing for an electric motor as defined by claim 1, wherein said means compressed between said cover and a portion of said casting for sealing the motor supported thereby comprises a sleeve encircling the portion of said casting that supports the electric motor, with said sleeve having its peripheral edges compressed against said casting and the under surface of said cover, for sealing the electric motor against dirt, dust, and debris when it is mounted within said collector canister.

3. A sealed and grounded housing for an electric motor as defined by claim 2, wherein said sleeve carries sealing gaskets mounted on its peripheral edges, with said gaskets compressed by said means for connecting said casting to said cover into sealing contact with said casting and said cover.

4. A sealed and grounded housing for an electric motor as defined by claim 2, wherein said means provided by said sealing means and cooperating with said casting for connecting a ground wire thereto comprises a tab integral with said sleeve and extending along a radius thereof into contact with a portion of said casting, with said tab yieldable through its normal plane during compression of said sleeve between said cover and said casting.

5. A sealed and grounded housing for an electric motor as defined by claim 3, wherein said means provided by said sealing means and cooperating with said casting for connecting a ground wire thereto comprises a tab integral with said sleeve and extending along a radius thereof into contact with a portion of said casting, with said tab yieldable through its normal plane during compression of said sleeve between said cover and said casting.

6. A sealed and grounded housing for an electric motor as defined by claim 2, wherein said means for connecting said casting to said cover comprises elongated connecting rods having one end threadable into said casting and their opposite ends projectable through said cover, with said rods disposed in spaced parallel relation within said sleeve when said sleeve is compressed by said connecting rods between said cover and said casting.

References Cited
UNITED STATES PATENTS

| | | | |
|---|---|---|---|
| 2,863,524 | 12/1958 | Buda | 55—467 X |
| 3,597,902 | 8/1971 | Williams | 15—353 |

DENNIS E. TALBERT, Jr.

U.S. Cl. X.R.

15—323, 412; 55—379, 471, 502, DIG. 3